United States Patent
Simson et al.

[11] Patent Number: 6,116,831
[45] Date of Patent: Sep. 12, 2000

[54] MORTISE DRILLING APPARATUS AND METHOD

[76] Inventors: Anton K. Simson, 14530 Espola Rd., Suite A, Poway, Calif. 92064; Mark T. Bentley, 2133 Shadetree La., Escondido, Calif. 92025; Robert C. Bentley, 211 Tanglewood, Duncanville, Tex. 75116

[21] Appl. No.: 09/263,334

[22] Filed: Mar. 5, 1999

Related U.S. Application Data

[63] Continuation-in-part of application No. 09/012,740, Jan. 23, 1998, Pat. No. 5,947,656.
[51] Int. Cl.[7] .................................................. B23C 3/30
[52] U.S. Cl. ........................ 409/178; 144/74; 144/218; 144/219; 407/53; 407/61
[58] Field of Search ................ 408/80, 82, 201; 409/177, 178, 181, 182, 175; 144/27, 74, 218, 219; 407/34, 53, 54, 61

[56] References Cited

U.S. PATENT DOCUMENTS

| | | | |
|---|---|---|---|
| 1,625,836 | 4/1927 | Tanguay | 407/53 |
| 4,412,571 | 11/1983 | Czerniewicz | 144/219 |
| 4,720,219 | 1/1988 | Masonek et al. | 408/201 |
| 4,865,093 | 9/1989 | Ford et al. | 409/178 |
| 4,975,001 | 12/1990 | Rabo et al. | 408/201 |
| 5,013,193 | 5/1991 | Rabo et al. | 408/201 |
| 5,222,842 | 6/1993 | Schweikert et al. | 407/53 |
| 5,284,406 | 2/1994 | Mueller et al. | 409/178 |
| 5,947,656 | 9/1999 | Simson et al. | 408/97 |

*Primary Examiner*—Daniel W. Howell
*Attorney, Agent, or Firm*—Henri J.A. Charmasson; John D. Buchaca

[57] ABSTRACT

A drilling template for carving into the lateral edge or the jamb of a door, a slot shaped and dimensioned to receive either a lock and its mounting plate or its strikeplate has a series of drill bit bores at regular spaced-apart intervals along a central line, a pair of lateral legs, and mounting holes corresponding to those of the lock or strikeplate. A drill is used to rout the lock blade slot through the drill bit bores. Guides in either side of the bores prevent lateral movement of the bit, but allow slight longitudinal swing to remove material that may remain between holes. The height of the guides may be varied along the length of the template to guide the routing for a slot of more uniform depth. Lateral spacers are provided to align the template against the angled part of the door jamb. A specialized routing drill bit is provided for drilling the strikeplate or lock channel. The bit has central pilot shaft for tracking within the lock blade slot and a removable circular toothed disk. An oblong countersink bit-guiding insert is provided which creates strikeplate or lock mounting plate channels having straighter sidewalls.

16 Claims, 4 Drawing Sheets

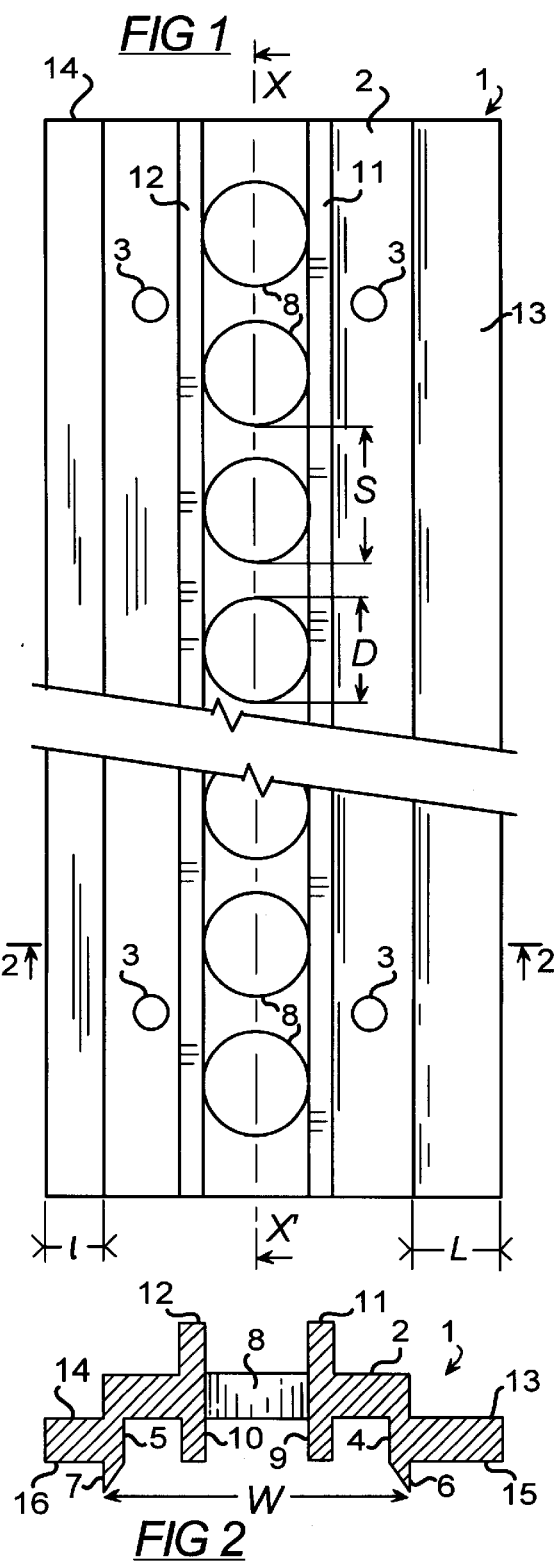
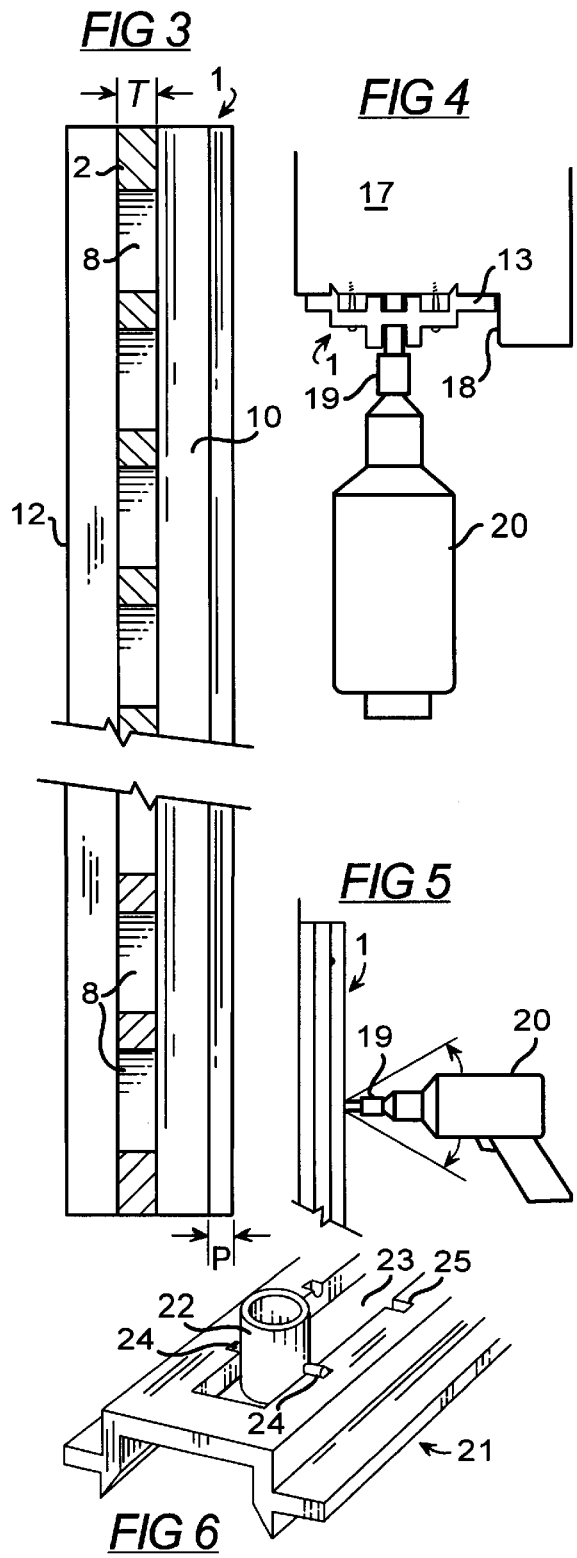

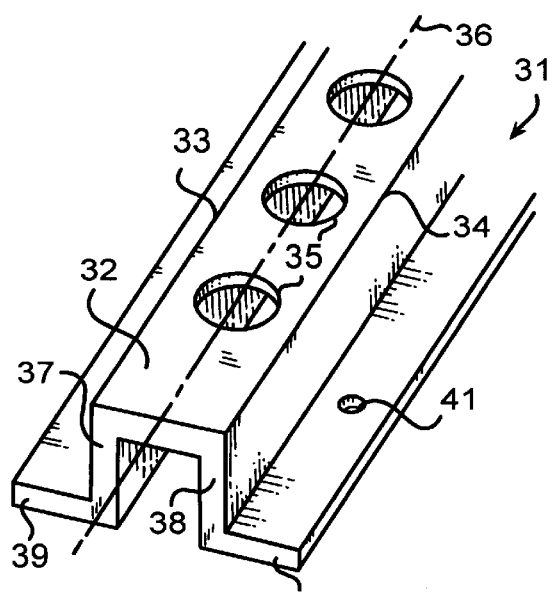
FIG. 7
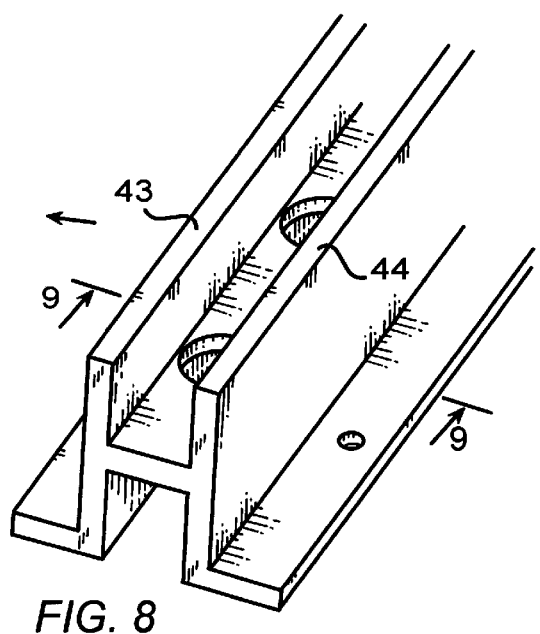
FIG. 8
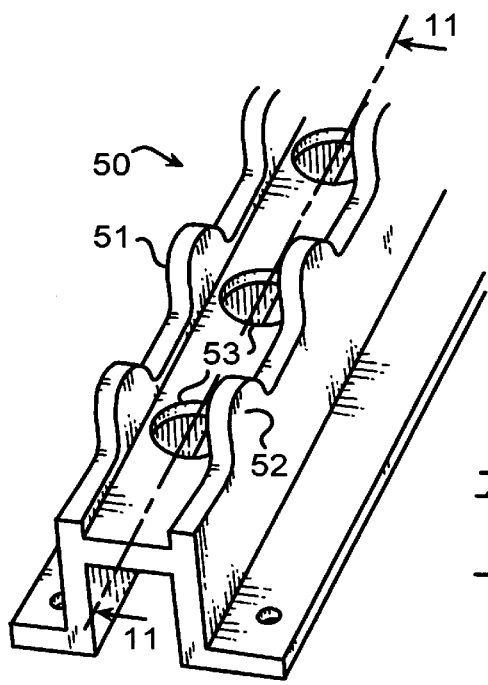
FIG. 10
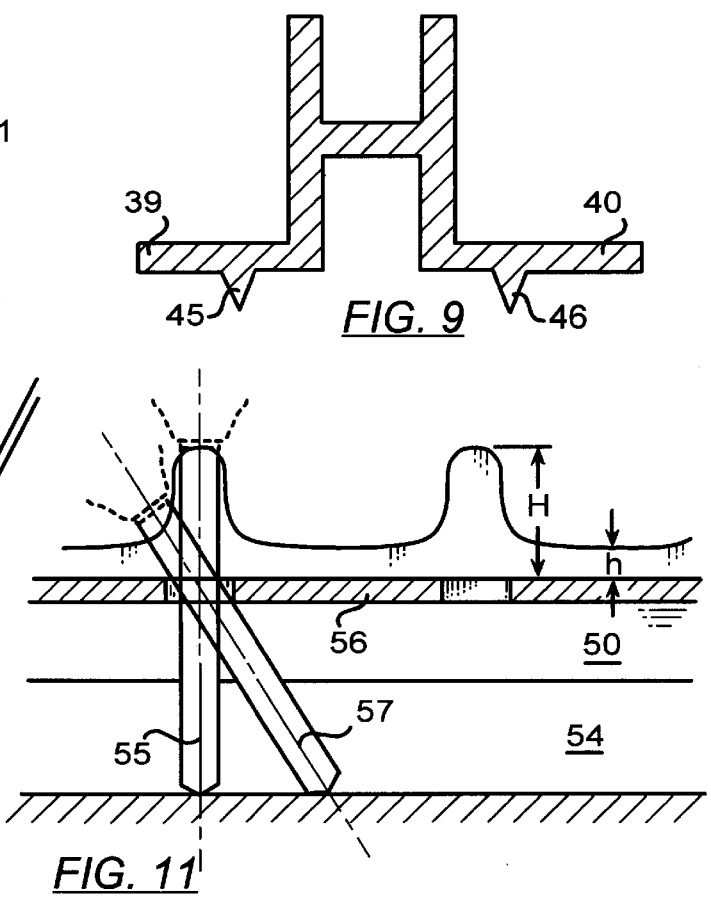
FIG. 9
FIG. 11

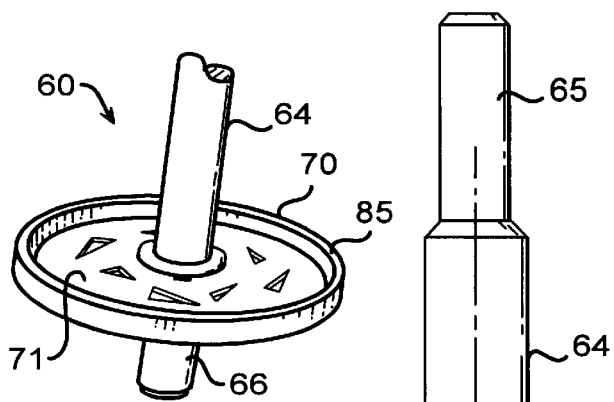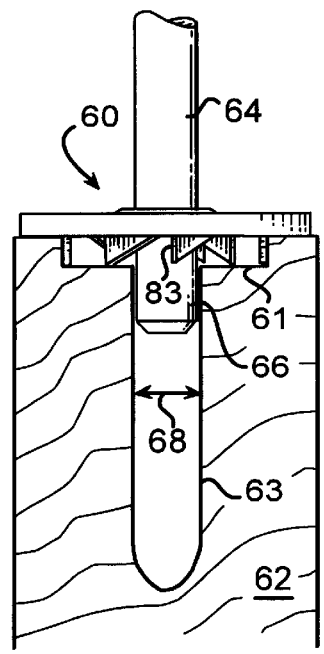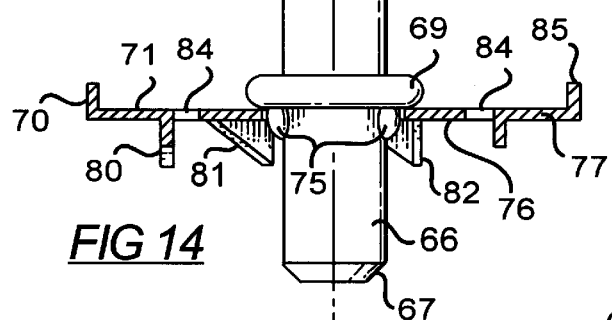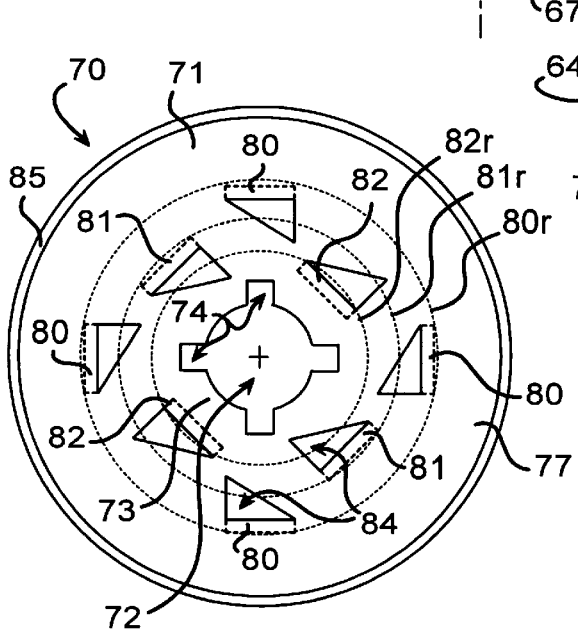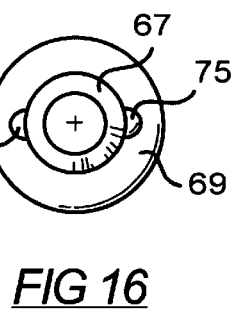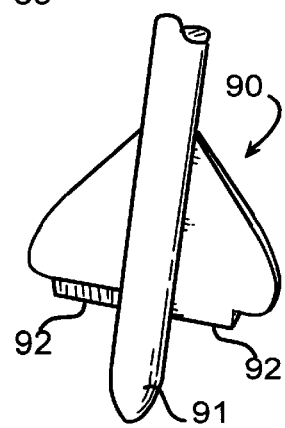
FIG 13
FIG 12
FIG 14
FIG 16
FIG 15
FIG 17

MORTISE DRILLING APPARATUS AND METHOD

PRIOR APPLICATION

This application is a continuation-in-part of application Ser. No. 09/012,740 filed Jan. 23, 1998, now U.S. Pat. No. 5,947,656.

FIELD OF THE INVENTION

This invention relates to woodworking templates such as those used in connection with routers and hand drills.

BACKGROUND OF THE INVENTION

The installation of a door or window lock often requires the carving of a cavity or slot in the edge of the door to accommodate, if not the entire lock, at least its bolt, and a countersunk channel to receive its mounting plate. Also, the jamb requires a corresponding mortise or slot that receives the bolt and a countersunk channel to flushly mount the strikeplate. Some locks of European design have wide rectangular bolts instead of the circular bolts commonly found in American-made locks. These rectangular bolts require the cutting of narrow long cavities seldom exceeding 0.95 centimeter (⅜ of an inch) in width. Blade locks such as the one disclosed in U.S. Pat. No. 5,697,654 MacDonald required the cutting of a narrow, deep and long cavity into the door edge to accommodate the lock blade, and a similar mortise in the door jamb to accommodate receiving the bolt. While a router can be used to cut the cavity in the door edge, the angled shape of door jambs make the use of a router difficult, if not impossible, to an unskilled or semi-skilled homeowner. Until now this type of blade lock has required professional installation. Similarly, formation of the countersunk channel for mounting the lock mounting plate or the strikeplate along the door edge or door jamb currently requires professional skill in routing or chiseling.

SUMMARY OF THE INVENTION

The principal and secondary objects of this invention are to provide a convenient tool for carving a long and narrow slot and countersunk channel in the edge of a door or a door jamb that can readily receive a lock or its strikeplate without having to use a router and complex and expensive tool jigs with such a simplicity that it can be done by a person with a modicum of mechanical skill.

It is another object of the invention to delineate with ease and precision, the lock mounting plate and strikeplate channels as well as their mounting holes.

It is another object of this invention to provide an inexpensive, easy-to-use routing drill bit for carving the lock mounting plate or strikeplate channels.

It is another object of this invention to provide a tool which directs the routing of a slot having a more uniform depth.

These and other valuable objects are achieved through the use of a simple drilling template having legs that can be temporarily and firmly attached onto the door edge or the door jamb. A series of regularly spaced-apart drill bit bores are provided along the central line of the template to guide the user in the routing of the slot by means of a common hand drill. Guides along the edges of the drill bit bores prevent lateral movement of the drill bit but allow for slight transversal movement to remove the material remaining between bores. The height of the guides may be varied along the length of the template to guide the routing of a slot having a more uniform depth. Spacers projecting from either side of the template help its positioning against the angled part of the jamb at the appropriate distance corresponding to the thickness of the door.

In one embodiment, the template legs define, not only the outline of the lock mounting plate or the strikeplate, but also the position of the mounting holes and the amount of material that must be removed to form their receiving channels.

A specialized bit is provided for drilling the strikeplate or lock mounting plate channel. The bit has central pilot shaft for tracking within the lock blade slot and a removable circular toothed disk.

An oblong countersink bit-guiding insert is provided which creates strikeplate or lock mounting plate channels having straighter sidewalls.

BRIEF DESCRIPTION OF THE DRAWING

FIG. 1 is a top plan view of the template according to the invention;

FIG. 2 is a cross-sectional view taken along line 2—2 of FIG. 1;

FIG. 3 is a cross-sectional view taken along line X–X' of FIG. 1;

FIG. 4 is a diagrammatical illustration of the positioning of the template on the door jamb;

FIG. 5 is a diagrammatical illustration of the drilling process;

FIG. 6 is a partial perspective view of an alternate embodiment of the template;

FIG. 7 is a partial perspective view of another alternate embodiment of the template;

FIG. 8 is a partial perspective view of another alternate embodiment of the template;

FIG. 9 is a cross-sectional view taken perpendicular to the central line of another alternate embodiment of the template;

FIG. 10 is a partial perspective view of another alternate embodiment of the template;

FIG. 11 is a cross-sectional view taken along line 11—11 of FIG. 10;

FIG. 12 is a partial cross-sectional diagrammatic illustration of the channel forming process using the countersink routing drill bit of the invention;

FIG. 13 is a partial perspective view of a countersink routing drill bit according to the invention;

FIG. 14 is a partial cross-sectional side view of the countersink routing drill bit;

FIG. 15 is a top plan view of the cutting plate of the countersink routing drill bit of the invention;

FIG. 16 is a bottom plan view of the pilot pin of the countersink routing drill bit of the invention;

FIG. 17 is a partial perspective view of another alternate embodiment of the countersink routing drill bit;

DESCRIPTION OF THE PREFERRED EMBODIMENT OF THE INVENTION

Figure 18:
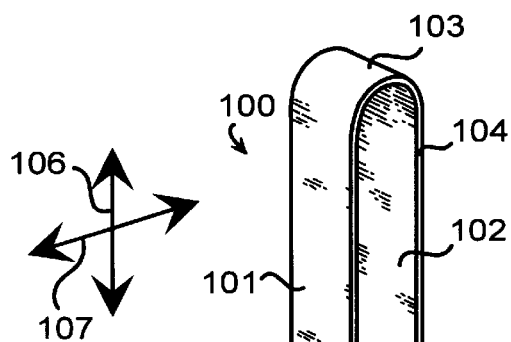
FIG. 18 is a partial perspective view of a first embodiment of the countersink bit-guiding insert feature of the invention.

The preferred embodiment of the invention is specifically intended for use in installing blade locks of the type disclosed in U.S. Pat. No. 4,697,654 MacDonald which patent is incorporated in this specification by this reference.

Referring now to the drawing, there is shown in FIGS. 1–6 a template 1 which has a central flat and elongated portion 2 whose outline corresponds to that of the lock mounting plate as well as its strikeplate. Mounting holes 3 along the sides and at each end of the template are preferably provided at the same locations as the mounting holes of the lock or strikeplate. Projecting orthogonally from the parallel edges of the central portion 2, are a pair of legs 4, 5 whose distal portions 6, 7 are tapered down to sharp ends. The spacing W between the sharp ends correspond to the width of the lock mounting plate or of the strikeplate. A series of drill bit bores 8 are provided at regular spaced-apart intervals S along the central line XX' of the central portion 2. The spacing S between bores is approximately equal to three halves of the bore diameter D. In the preferred embodiment of the invention the bores have a diameter ranging from 0.8 to 0.95 centimeters (5/16 to 3/8 of an inch). Parallel guide walls 9, 10 extend between the legs 4, 5 on either side of the series of bores 8. Similar guide walls 11, 12 extend on the opposite side of the central portion 2. Those guide walls are designed to prevent lateral movement of the drill bit. The relatively shorter thickness T of the central portion, by contrast, allows for a certain degree of longitudinal swing of the drill bit. The thickness T of the central portion should not exceed about one-quarter of the diameter D of the bores. The difference P between the length of the internal guiding walls 9, 10 and the length of the legs 4, 5 corresponds preferably to the thickness of the lock mounting plate or of the strikeplate so that when the template is hammered down into the edge of the door or into the door jamb until the internal guiding walls 9, 10 become in contact with the door or jamb material, the amount of penetration P of the leg into the material corresponds to the amount to be removed in order to form the channel that will nest the lock mounting plate or the strikeplate.

A pair of spacers 13,14 project outwardly and orthogonally from the outer side of the legs 4, 5. Those spacers have different lengths L, 1, and are intended to help positioning the template against the door jamb at a given distance from the angled part of the jamb. That given distance either L or 1 is predicated on the thickness of the door. It should be noted that the lower sides 15, 16 of the spacers are at the same levels as the end of the internal walls 9, 10 in order to provide a convenient indication to the user how far the template should be hammered down into the door edge or door jamb.

As illustrated in FIG. 4, the template 1 is hammered into the door jamb 17 with one of the spacers 13 abutting the angled part 18 of the jamb. Typically, a 4.5 centimeter (1.75 inch) door thickness would require the use of the longer spacer 14. A 3.2 centimeter (1.25 inch) door thickness would call for the use of the shorter spacer 13.

It can now be understood that this type of template can be conveniently positioned against the door edge or the door jamb then hammered down to delineate the mounting plate or strikeplate channel before it is fastened with screws using the mounting holes 3 which are in the same location where the mounting screws of the lock or strikeplate are positioned. As illustrated in FIG. 5, the drilling of a slot in either the door edge or the door jamb is a multi-step, yet uncomplicated operation requiring a modicum of skill. A sleeve 19 may conveniently be mounted on the drill bit to limit its penetration to the depth required by the lock or the bolt. Using a hand-drill 20, the user begins by drilling a series of perpendicular holes through the guide bores 8 to the desired depth corresponding to the width of the lock or the width of the strikeplate. In a second pass, the drill is tilted longitudinally at an angle of approximately thirty degrees, first in one direction then, in a third pass, to the same angle, in the opposite direction in order to remove the material remaining between the series of drill holes. Due to the fact that the bottoms of the guide bores 3 are spaced apart from the surface of the door edge or door jamb, the angled drilling is sufficient to remove all the material between the initial right angle holes. The template is then removed before mounting the lock or its strikeplate.

It should be understood that the outer set of guide walls 11, 12 could be omitted without seriously downgrading the effectiveness of the template.

In an alternate embodiment 21 of the invention illustrated in FIG. 6, the guide walls are replaced by one or a set of guiding sleeves 22 swingingly mounted into a slot 23 running along the central line of the template. Small pivot nibs 24 extending from opposite sides of the sleeves are either permanently attached to the edges of the slot or ride in small bearing notches 25 cut into those edges.

In another embodiment of the invention, referring now to FIG. 7, there is shown a template 31 having a central flat elongated horizontal portion 32 having parallel edges 33,34, drill bit bores 35 spaced along a central line 36, and orthogonally downward extending legs 37,38. As in the previous embodiment, a pair of spacers 39,40 project outwardly and orthogonally from the outer sides of the bottom ends of the legs. The spacers can be dimensioned to help position the template against the door edge or jamb. Mounting holes 41 are formed through the spacers to mount the template to the door or jamb. Preferably, the mounting holes are provided at the same locations as the mounting holes of the lock or strike plate.

The size and location of the drill bit bores and the thickness of the central portion are selected according to the previous embodiment.

FIG. 8 shows that although not necessary, it is preferable to provide extended guide walls 43,44 for further preventing lateral movement of the drill bit. In this embodiment, the guide walls and legs are formed into integrated vertical side walls of the template.

As shown in FIG. 9, a pair of sharp ended prongs 45,46 may extend down from a bottom surface of the spacers 39,40 to facilitate securing the template to the door edge or jamb.

In yet another embodiment 50 of the invention as shown in FIGS. 10–11, the template is formed having guide walls 51,52 undulating height. Adjacent to the drill bores 53 the height H is higher than the height h between bores. This feature allows the drill bit to penetrate to a certain depth into the door edge or jamb 54 when the drill bit axis 55 is generally perpendicular to the plane of the central portion 56. However, when the angle of incidence of the bit axis 57 is off orthogonal, the guide allows penetration to a greater depth. Indeed, the changes in height can be selected to create a slot having a more uniform depth.

The template may be made of steel, aluminum or a hardened plastic such as a glass-reinforced plastic.

Now will be described, referring now to FIGS. 12–16, the preferred specialized drilling bit 60 for creating the strikeplate or lock mounting plate slot 61 into the door edge or jamb 62 using the lock blade cavity 63 as a guide. The bit 60 comprises a substantially cylindrical shaft 64 adapted at an upper end 65 to secure to a drill chuck. The opposite end is formed into a pilot pin 66 that is rounded or chamfered 67 or otherwise shaped to form a surface which is non-destructive when spinning within the slot 63. The diameter of the pilot pin is commensurate with the width 68 of the slot.

The bit further comprises a substantially disk-shaped carbide steel cutting plate 70 formed by a circular base 71 having a central hole 72 sized to allow for penetration of the pilot pin therethrough. The hole is small enough to allow a portion 73 of the base to rest against a toroidal stopper 69 girdling a medial portion of the pin 64 thereby preventing axial movement of the plate in relation to the pin. Notches 74 are formed into the hole wall to allow for engagement of tabs 75 jutting radially out from the side of the pin below the stopper thereby preventing angular movement of the plate in relation to the pin.

A number of cutting teeth 80,81,82 extend axially downward from a lower surface 76 of the base between the central hole and an annular peripheral flange 77 whose substantially planer lower surface acts as a stopping surface by bearing against the door edge or jamb limiting penetration of the bit. Each tooth has a generally triangular shape having a cutting surface 83 facing the direction of the cut. The axial length of the teeth is selected to provide the proper depth of the channel 61.

The number and location of the teeth is determined by several factors such as speed of the drill, the type of wood, and cost of manufacture. Further, their size and location must be selected to provide axial mass symmetry to properly balance the bit.

In the preferred approach, a first pair of diametrically located teeth 82 are placed at a first radial distance 82r from the center. A second pair of teeth 81 are placed at a second greater radius 81r and angularly offset by 90°. At a third, yet greater, radius 80r, a set of four teeth 80 are placed equally apart angularly. It should be noted that, in general, to minimize wear of the bit, more teeth are provided as the radius increases due to the increase amount of wood being removed.

The teeth are most economically formed via a cold stamping process that punches and folds downward each generally triangular tooth. Some post stamping machining may be necessary to most efficiently shape and orient the cutting face of each tooth. Therefore, the completed plate is most preferably formed from a single piece of metal without welding or otherwise fastening the teeth or other structures.

Since the tooth material is taken from the plate and folded downward, the size, location and orientation of the folds are selected to avoid unnecessary reduction in the overall strength of the plate. For example, the radially innermost pair of teeth 82 are folded radially inward whereas the other teeth are folded outward. Although the teeth are shown projecting orthogonally from the base in various embodiments, the teeth can be oriented at an angle to enhance removal of wood. Of course, to provide a uniform depth depression, the angled teeth should be made trigonometrically longer. To maintain vertical depression side walls, some of the outer most teeth 80 should be vertical and none should angle outward.

The stamping process also forms a generally triangular aperture 84 radially adjacent to each tooth. These apertures allow for the removal of sawdust during operation. Therefore, the apertures exist radially inward from the outermost teeth. To enhance plate rigidity and strength, a cylindrical wall 85 extends upward from the periphery of the base.

The number and location of the teeth are selected to provide adequate cutting of common woods used for doors and door jambs such as pine and oak.

The plate is firmly attached to the pilot shaft. However, alternately, the cutting plate can be made to be removable from the pilot shaft allowing simple and economical replacement when worn or damaged without discarding the entire bit, or to adjust bit sizes and cutting depths.

Alternately, as shown in FIG. 17, a specially adapted countersinking bit 90 may be used. This bit differs from typical bits in that its tip 91 is formed into a pilot shaft that is rounded or otherwise shaped to non-destructively spin within the slot, but guide the location of the cutting surfaces 92. Flattened flanges 93 prevent cutting beyond a certain depth. This approach is less preferable due to angular instability during the lengthwise traversal through the slot.

Figure 19:
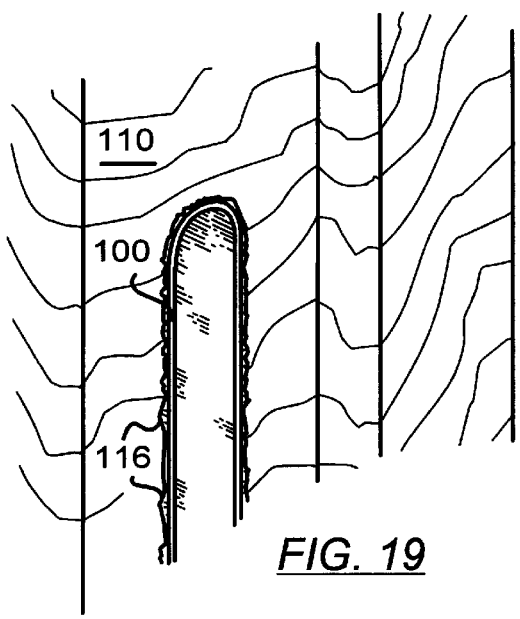
FIG. 19 is a partial perspective view of the insert of FIG. 18 placed into the mortise on the edge of a jamb prior to countersink drilling.
Figure 20:
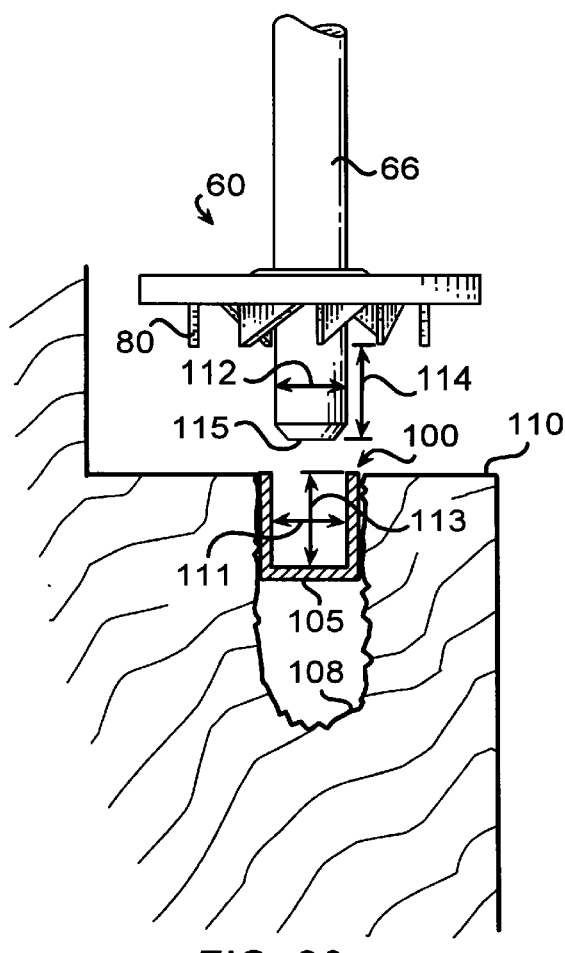
FIG. 20 is a diagrammatic partial cross-sectional top view illustration of the countersink channel forming process using the bit-guiding insert prior to channel formation.
Figure 21:
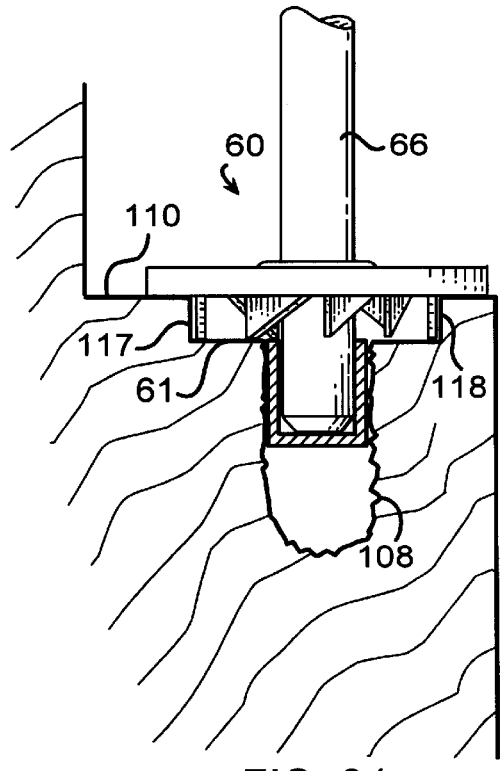
FIG. 21 is a diagrammatic partial cross-sectional top view illustration of the countersink channel forming process using the bit-guiding insert during channel formation.

Now will be described, referring now to FIGS. 18–21, the preferred bit-guiding insert 100 for guiding the above described routing drill bits during the formation of the lock mounting plate or strikeplate channels so as to create channels having smoother and straighter sidewalls. The insert 100 is basically an oblong basket having parallel vertical sidewalls 101,102 joined and terminated by an inwardly concave circular endwall 103 at its top and bottom ends, thereby forming an oval shaped front edge 104. An oval shaped back wall 105 orthogonally joins the walls along the back edge. The outer dimensions in height 106 and width 107 of the insert is selected to allow for snug but movable placement into the slot 108 in the door or jamb 110 prior to channel routing. The inner width 111 of the insert is substantially commensurate with the diameter 112 of the pilot pin 66 of the routing drill bit 60. The inner depth 113 of the insert is selected to be no greater than the distance 114 from the bottom extremity 115 of the pilot pin to the bottom extremity of the cutting teeth 80. In this way, the insert is forced further into the mortise while the channel 61 is routed without contacting the teeth.

The insert naturally normalizes the width and location of the slot for purposes of creating the lock mounting plate or strikeplate channels. Any perturbations 116 or inaccuracies in the slot are overcome, generating smooth and straight channel sidewalls 117,118.

The insert is preferably made from inexpensive, durable, somewhat flexible, rigid material such as polypropylene plastic. This material is easily formed into the shape of the insert with smooth inner walls. The preferred thickness of the walls is about 0.03 to 0.07 inch, and most preferably about 0.05 inch.

Where possible the insert should be sized to allow for insertion into the door slot first, whereupon the lock mounting plate channel is routed. The insert is then extracted using a screwdriver engaging a hole in the back wall or through a pull tab or other means, and inserted into the jamb mortise. Upon routing the strikeplate channel, the insert may be left in place to provide an attractive dark appearance to the mortise. This feature is enhanced by using a dark colored material for the insert.

While the preferred embodiment of the invention has been described, modifications can be made and other embodiments may be devised without departing from the spirit of the invention and the scope of the appended claims.

What is claimed is:

1. A routing drill bit comprises:

a substantially cylindrical pilot pin having an axis of rotation and a top end adapted to mount upon a hand drill chuck;

a substantially circular cutting plate having top and bottom surfaces, said plate being axially securable about a median portion of said pin;

a plurality of cutting teeth extending downward from said bottom surface and located at a plurality of radial distances from said axis.

2. The routing drill bit of claim 1, wherein said pilot pin has an opposite bottom end terminating axially below said teeth.

3. The routing drill bit of claim 2, wherein said opposite bottom end is blunt.

4. The routing bit of claim 2, wherein said opposite bottom end is sized and dimensioned to track within a bit-guiding insert placed in a slot in a door jamb.

5. The routing drill bit of claim 1, wherein a first one of said teeth has a substantially triangular shape.

6. The routing drill bit of claim 1, wherein said plate further comprises a section of said lower surface extending radially beyond a radial position of an outermost one of said teeth, thereby forming a stopping surface.

7. The routing drill bit of claim 1, wherein said plate further comprises an annular rigidizing ring extending upward from a peripheral edge of said plate.

8. The routing drill bit of claim 1, which further comprises means for removably mounting said plate to said pin.

9. The routing drill bit of claim 8, wherein said means for removably mounting comprise:

a stopper girdling a median portion of said pin;

at least one nib radially projecting from said pin below said stopper;

at least one notch in said plate sized and positioned to accept said nib and provide a bearing surface against said nib, thereby preventing angular movement of said plate in relation to said pin.

10. The routing drill bit of claim 1, wherein said bit is formed from a single piece of metal.

11. The routing drill bit of claim 1, which further comprises said plate having an aperture radially adjacent to each of said plurality of teeth.

12. The routing bit of claim 1, wherein a first one of said teeth has a first adjacent aperture located a greater radial distance from said first one of said teeth, and a second one of said teeth has a second adjacent aperture located a lesser radial distance from said second one of said teeth.

13. An apparatus routing a channel in a surface having an oblong slot, said apparatus comprises:

the routing drill bit of claim 1; and an elongated, bit-guiding insert sized and dimensioned for placement in said slot.

14. The apparatus of claim 13, wherein said insert comprises:

an elongated back wall; and a substantially parallel pair of sidewalls extending substantially orthogonally from said backwall;

wherein said sidewalls are spaced apart a distance substantially commensurate with the diameter of said pilot pin.

15. The apparatus of claim 14, wherein said insert is dimensioned to avoid contact with cutting teeth associated with said bit during use.

16. An apparatus for routing a channel in a surface having an oblong slot, said apparatus comprising:

a routing drill bit having a substantially cylindrical pilot pin; and an elongated, substantially basket-shaped insert sized and dimensioned for placement in said slot.

* * * * *